United States Patent

[11] 3,623,780

| [72] | Inventor | Ralph W. Kell<br>Lincoln, Nebr. |
|---|---|---|
| [21] | Appl. No. | 883,716 |
| [22] | Filed | Dec. 10, 1969 |
| [45] | Patented | Nov. 30, 1971 |
| [73] | Assignee | The Goodyear Tire & Rubber Company<br>Akron, Ohio |

[54] BELT TRACK
11 Claims, 8 Drawing Figs.

[52] U.S. Cl. ................................................ 305/38
[51] Int. Cl. ............................................. B62d 55/24
[50] Field of Search ............................... 305/35 EB,
37, 38; 152/210, 211

[56] References Cited
UNITED STATES PATENTS

| 2,461,150 | 2/1949 | Flynn | 305/35 EB |
| 3,027,200 | 3/1962 | Patterson | 305/37 |
| 3,439,959 | 4/1969 | Bowen | 305/38 |
| 3,469,553 | 9/1969 | Gagne | 180/5 |
| 3,485,312 | 12/1969 | Swenson | 180/5 |
| 2,025,999 | 12/1935 | Myers | 305/38 |

FOREIGN PATENTS

| 610,777 | 12/1960 | Canada | 180/5 |

Primary Examiner—Richard J. Johnson
Attorneys—F. W. Brunner and Ronald P. Yaist

ABSTRACT: An endless vulcanized belt track for track vehicles, such as snowmobiles, having a body of elastomeric material and a plurality of spaced rigid elongated traction elements extending generally transversely of the belt track. The traction elements are secured onto the body to form an integral structure with a substantial projecting portion available to provide ground contact. The integral traction structure eliminates the need for attaching elements such as bolts or rivets.

PATENTED NOV 30 1971

INVENTOR.
RALPH W. KELL

BY

*R P Yaust*
ATTORNEY

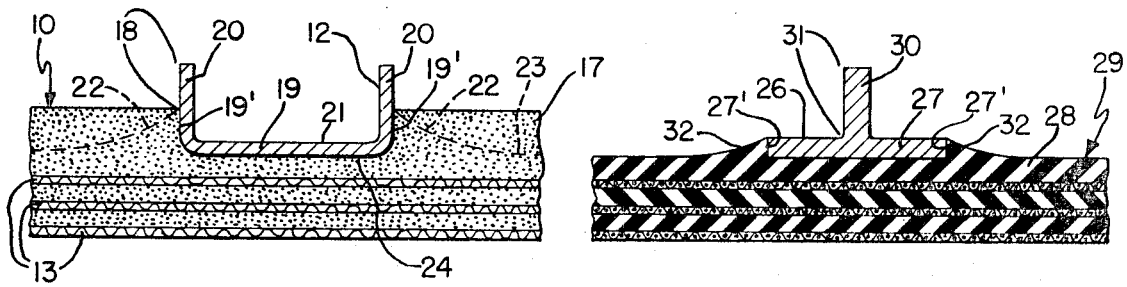
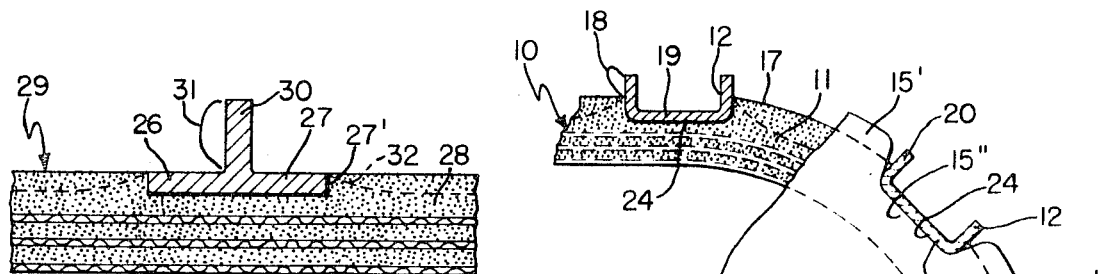
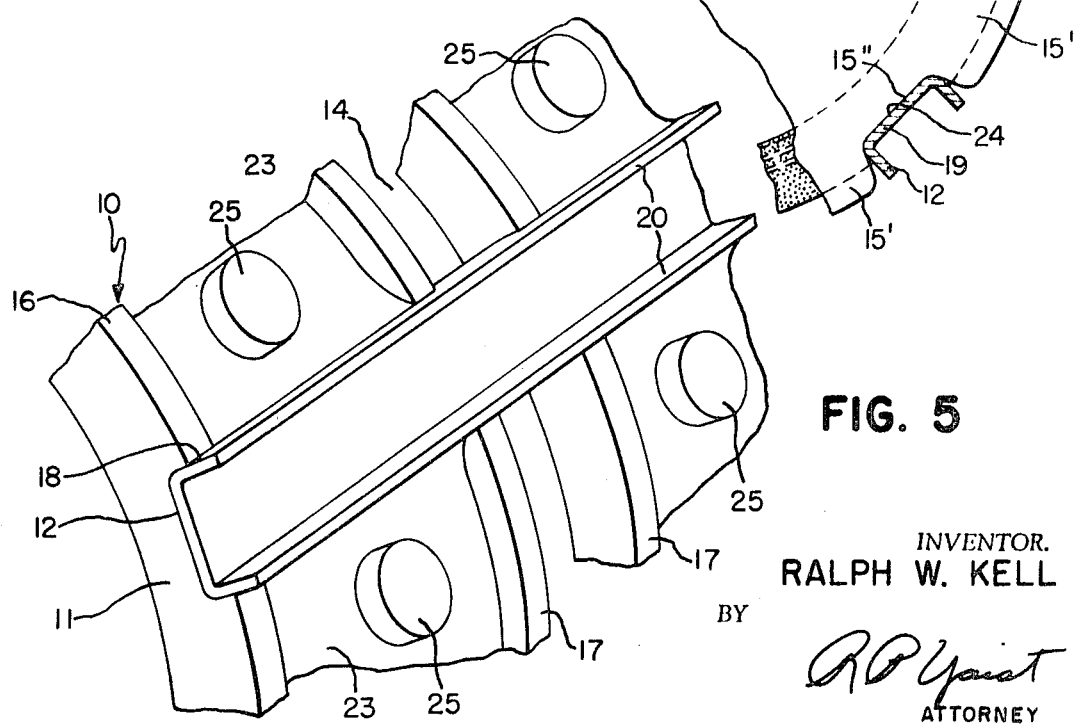

BELT TRACK

BACKGROUND OF THE INVENTION

This invention relates to endless belt tracks for track vehicles and more particularly to a belt track for a snow-traveling vehicle such as a snowmobile or the like. This invention has particular application to novel and improved traction means for such vehicles.

Snowmobiles are small half-ski, half-track, motor-driven vehicles used for traveling over the snow and ice and have recently become increasingly popular with hunters, trappers, rescue teams, ski patrols, as well as winter sports enthusiasts who, for example, use them for racing. These vehicles typically include one or two endless-drive belts with lugs or cleats in the outer surface for traction on the slippery surfaces over which they travel. These belts are generally made of tough high-quality rubber or like material and are longitudinally reinforced with textile fabric material to insure longitudinal stability.

It is extremely important that this type belt be relatively flexible in the longitudinal direction to perform its driving function and yet be substantially stiff or rigid in the transverse direction to prevent belt sag and provide reinforcement for openings in the belt which engage the sprocket teeth of the vehicle drive. More importantly, the belt must be transversely rigid since it provides the primary vehicle support and flotation on soft snow surfaces. It is, therefore, apparent that the combination of adequate traction and transverse rigidity are extremely important considerations in the design of belt tracks for the vehicles of the class just mentioned.

In the prior art, one means of providing transverse rigidity has been to use a plurality of metal rods or bars extending laterally or transversely of the belt and embedded at least substantially therein. The traction for the belt has been provided by a ground-engaging corrugated cover of elastomeric material. An example of this belt construction is disclosed in Bombardier U.S. Pat. No. 2,899,242. However, this previously described structure has known disadvantages. For instance, since the traction elements are lugs or corrugations composed largely of rubber, insufficient traction is provided, especially when the snowmobile vehicle travels over such soft surfaces as loose snow or sand. Furthermore, the incorporation of metallic elements within elastomeric belts has a detrimental effect on the physical properties thereof and may significantly interfere with the belt's functioning.

In this regard, it has also been common in the art to bolt, rivet, or in some fashion, mechanically attach transverse metal bars or channels onto a planar belt surface to provide the necessary driving traction and transverse rigidity. For example, such a structure is disclosed in Howes U.S. Pat. No. 3,164,417. The advantage of this structure as opposed to the structure in which the metal elements are embedded in the elastomeric material is the high degree of increased traction attainable because of the substantial portion of the element available for ground contact. In addition, a higher degree of transverse rigidity is achieved because of the size and shape of the metal elements which can be attached externally of the belt as opposed to those which can be incorporated into the belt structure. However, the externally fastened traction elements or cleats also have many disadvantages. For example, the bolts or rivets may corrode and/or break loose during service, thus adversely affecting the operation of the vehicle. In addition, the use of rivets ordinarily requires extra layers or plies of fabric material within the belt structure for the purpose of securing or maintaining the rivets in position, thereby increasing the overall weight of the belt track. Obviously, the added cost of a punching or riveting operation is also a disadvantage incumbent with this structure. Another not so obvious, but still serious disadvantage of the riveted construction is the fact that a substantially planar belt surface is required onto which the cleats are attached. This surface does not provide adequate stability for the vehicle in the lateral direction since no longitudinal traction means is present. Consequently, the vehicle tends to slip when traveling on sidehill terrains. In addition, presently available belt tracks having externally mounted traction elements are subject to excessive wear especially in the area of the sprocket-receiving openings since no wear surface is provided to contact elements of the vehicle drive or suspension means.

The disadvantages, as previously discussed, are overcome by the use of the belt tracks of the present invention having novel and improved traction means, as will be hereinafter described.

OBJECTS OF INVENTION

It is an object of the present invention to provide a belt track for track vehicles having an externally mounted traction element which does not require the use of bolts or rivets to attach it to the belt surface.

It is another object of this invention to provide a relatively low-cost, lightweight belt track for a snow-traveling track vehicle having the combined properties of maximum transverse rigidity and improved traction.

It is still another object of this invention to provide a belt track which will increase the lateral traction and stability of the vehicle on which it is used.

It is still a further object of this invention to provide an improved traction element for a belt track which will act as a wear surface to contact the drive means of the vehicle on which it is used.

Other objects and advantages of this invention will become apparent hereinafter as the description thereof proceeds, the novel features, arrangements and combinations being clearly pointed out in the specification as well as the claims thereunto appended.

It has been found that these foregoing objects are accomplished by providing an endless vulcanized belt track for a track vehicle comprising a body of flexible elastomeric material and a plurality of space, rigid, elongated traction elements extending generally transversely of the belt track to provide the necessary transverse rigidity therefor. Each of the traction elements are secured onto the body of the belt track preferably during vulcanization of the belt track to form an integral structure with a substantial portion projecting outwardly from the belt track to present an exposed surface for ground contact, thereby providing traction for the vehicle.

The body preferably includes raised sections along each lateral edge of the belt track and a plurality of ribs extending longitudinally of the belt track which are integrally formed therewith to provide lateral stability for the vehicle during its operations, for example, on sidehill terrains.

Each traction element preferably includes a base and at least one leg projecting from one surface of the base to provide traction for the vehicle. For example, the traction element may be a generally U-shaped or inverted T-shaped metallic member. Especially when the belt track of this invention is used on a small track vehicle, such as a snowmobile, the traction element is preferably aligned with elements of the vehicle driving or suspension means so that at least a portion of the surface of the element contacts these elements of the vehicle drive or suspension means to provide a wear surface therefor.

BRIEF DESCRIPTION OF THE DRAWINGS

In the drawings:

FIG. 4 is an enlarged section taken on line 4—4 of FIG. 2;

FIG. 5 is a modification of the invention shown in FIG. 1;

FIGS. 6 and 7 are a modification of the invention shown in FIGS. 3 and 4, respectively; and FIG. 8 is a fragmentary elevational view showing the operation of the traction elements of this invention in conjunction with a sprocket drive of a snowmobile vehicle.

DESCRIPTION OF THE PREFERRED EMBODIMENTS

Figure 1:
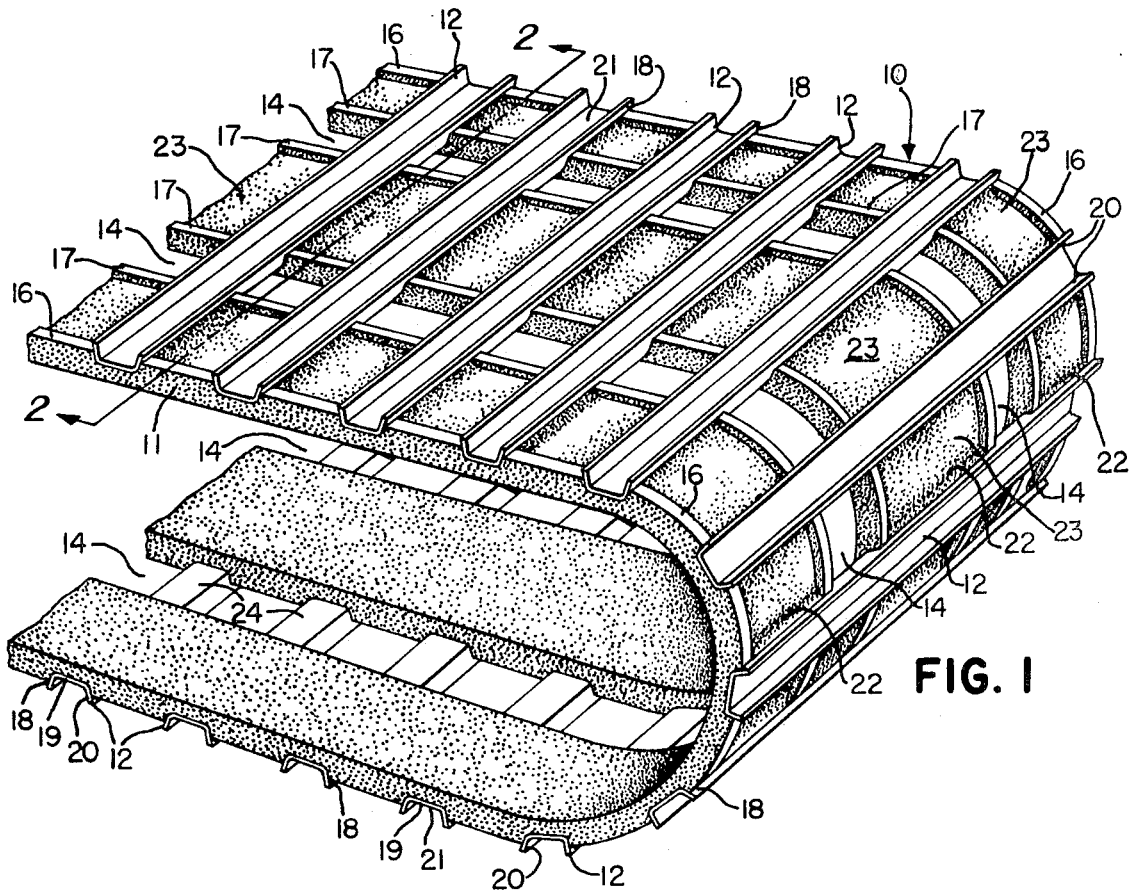
FIG. 1 is a perspective view of a portion of the belt track of this invention.

In FIGS. 1 through 4 an endless vulcanized belt track 10 for a track vehicle, such as a snowmobile, is shown having a body 11 of elastomeric material and a plurality of spaced, rigid, elongated traction elements 12 extending transversely of the belt track 10 which are secured onto the body 11 to form an integral structure, preferably during vulcanization of the belt track 10.

The body 11 includes reinforcement 13 preferably composed of layers or plies of textile fabric material either in square-woven or cord form, such as nylon, rayon or polyester. However, if desired, other types of reinforcing material, such as Fiberglas or metal, may also be used. The reinforcement 13 primarily provides the required lateral stability for the belt track 10. The body 11 has two rows of longitudinally disposed openings 14 therethrough to accommodate the vehicle drive means, such as a sprocket and sprocket tooth represented in broken lines in FIG. 2 by numerals 15 and 15', respectively. Of course, it is to be understood that is some instances only one row or even more than two rows of openings may be provided, depending upon the type of drive being used. The body 11 also preferably includes raised sections 16 along each lateral edge of the belt track 10 and a plurality of ribs 17 extending longitudinally of the belt track 10 integrally formed therewith to provide lateral stability for the vehicle during its operation. The ribs 17 are preferably formed at those edges of the sprocket-receiving openings 14 which extend longitudinally with respect to the belt 10.

The traction elements 12 are appropriately spaced longitudinally of the belt track 10 in such a manner as to provide the required stiffness or rigidity therefor. The elements 12 are preferably continuous rigid members of cast iron, steel or the like which extend the entire width of the belt track 10 but may, of course, also terminate short of the belt's lateral edges. The traction elements may in addition also be a plurality of rigid members of relatively short lengths spaced end to end, or even in a staggered relationship across the width of the belt track in at least a generally transverse direction. The traction elements 12 form those edges of the openings 14 which extend transversely with respect to the belt 10 and together with the body 11 and the longitudinal ribs 17 define the space or opening 14 of a generally rectangular configuration. Although the traction element 12 is preferably composed of metal, it is to be understood that other materials, such a Fiberglas or rigid plastic, are also suitable for this application.

Figure 2:
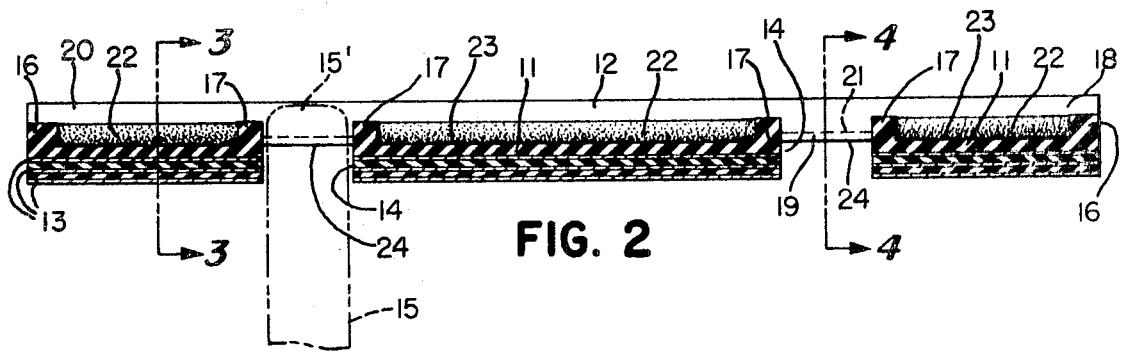
FIG. 2 is an enlarged section taken on line 2—2 of FIG. 1.
Figure 3:
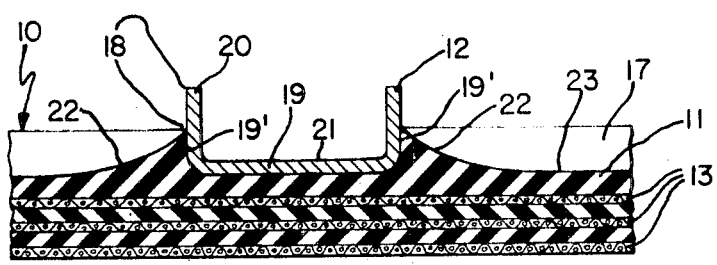
FIG. 3 is an enlarged section taken on line 3—3 of FIG. 2.

The detailed structure of the improved traction means of this invention is most clearly shown in FIGS. 2, 3 and 4. Each traction element 12 includes a substantial portion 18 projecting outwardly from the body 11 of the belt track 10 to present an exposed surface for ground contact, thereby providing traction for the vehicle. Preferably, the traction element 12 includes a base providing intimate contact with the body 11 of the track 10 for at least substantially the entire length of the element 12 and at least one leg projecting from a surface of the base. For example, in this instance, the traction element 12 is a generally U-shaped metallic member, such as a steel channel having a base 19 and legs 20 projecting from the ground-side surface 21 of the base 19 which present substantial projecting portions 18 to provide traction. The projecting portions 18 of the legs 20 may have a sharp exposed edge to provide maximum traction, as best shown in FIGS. 2 through 4, or may be rounded or curved inwardly in varying degrees to increase the strength and durability of the element 12 and to prevent excessive wear thereof during the operation of the vehicle over hard surfaces, such as concrete roadways or the like.

Preferably, fillets 22 of elastomeric material are formed on the body 11 along each side 19' of the base 19 of each traction element 12 to further secure the element 12 to the body 11. It should be noticed in this regard that the traction element 12 is not in any way substantially embedded into the body 11 of the belt track 10 but is secured onto the ground-contacting surface 23 of the body 11 and firmly fixed thereto by the rubber-to-metal adhesive bond formed during vulcanization of the belt track 10. This is most clearly shown in FIGS. 3 and 4. The integral traction structure thus formed eliminates the need for attaching elements such as bolts or rivets and thereby a relatively lightweight belt track 10 is provided. It may also be desirable, although not necessary, to provide voids or holes in the base 19 which, due to the flow of elastomeric material during vulcanization, forms a mechanical bond of sorts to increase the shear-strength of the bond between the body 11 and element 12. As shown in FIG. 4, a portion of the drive-side surface 24 of the base 19 is exposed for contact with elements of the vehicle driving or suspension means as will be hereinafter described with reference to FIG. 8.

The belt track 10 of this invention is formed in a largely conventional manner by conventional vulcanization equipment. The body 11 of the track 10 may be composed of separate belt sections formed of a plurality of strips or layers of elastomeric material and textile fabric material which are built up according to established procedures to the proper dimensions and placed in a mold. For example, three such belt sections can be used to form the belt track 10, as shown in FIGS. 1 through 4. Each traction element 12 is cleaned and preferably roughened by sandblasting or some other well-known means and subsequently coated with a suitable metal-to-rubber adhesive. The corresponding surfaces 23 of the elastomeric body 11 which are to come in contact with the elements 12 may also be similarly prepared. The elements 12 are then placed in a mold cavity of, for example, a belt vulcanizing press or a circular endless mold with an inside diaphragm, so as to be disposed transversely of the belt sections in such a manner as to define the sprocket-receiving openings 14. The belt components are then vulcanized under heat and pressure to form the belt track 10 of this invention with a rubber-to-metal bond being created between the body 11 and the element 12 during vulcanization, thereby providing the integral structure of this invention. Alternately, the belt track 10 may be formed as a single composite belt unit with the sprocket-receiving openings 14 cut or punched out subsequently to the vulcanizing operation.

Molded portions, such as the fillets 22, raised sections 16 and the ribs 17, along with any other traction surface configurations, are formed by using a mold having the desired contour. As previously mentioned, conventional belt tracks with externally mounted traction elements not formed by such a molding technique do not include these molded portions. It may be desirable, for instance, as shown in FIG. 5, to form a plurality of lugs 25 of elastomeric material onto the body 11 of the track 10 to provide added traction for the vehicle on which it is used. The lugs 25 may be of any shape or cross-sectional configuration, such as oval, as shown in FIG. 5, and are preferably disposed between each traction element 12 longitudinally of the belt track 10 and between each sprocket-receiving opening 14 transversely of the belt track 10.

FIGS. 6 and 7 show a modification of the invention in which the traction element 26 is a generally inverted T-shaped metallic member having a base 27 formed onto the body 28 of the belt track 29 and a leg 30 which projects outwardly from the body 28 to present an exposed surface 31 for ground contact. Of course, more than one leg may extend from the base to provide additional traction. Fillets 32 of elastomeric material preferably are provided at each side' of the base 27 to further secure the element 26 to the body 28.

FIG. 8 shows the belt track 10 as installed, for example, in a snowmobile vehicle. Each traction element 12 is preferably aligned with sprocket 15 of the vehicle so that at least a portion of the surface of each element 12 contacts the sprocket 15 to provide a wear surface on which the sprocket 15 rides. For example, as shown in FIG. 8, each of the sprocket teeth 15' contact and drive against a surface of leg 20 of the U-shaped traction element 12 and the portion 15'' of the sprocket 15 between each sprocket tooth 15' rides against the surface 24 of the base 19 of the traction element 12. The surface 24 of the traction element 12 also provides a contact surface for slider bars (not shown) used in the suspension system of some snowmobiles or other track vehicles.

It should be apparent to one skilled in the art that the belt track of this invention, including the novel traction means as previously described, is capable of providing significantly improved traction when contacting loose snow and other similar type surfaces and, in addition, provides a high degree of transverse rigidity.

While certain representative embodiments and details have been shown for the purpose of illustrating the invention, it will be apparent to those skilled in the art that various changes and modifications may be made therein without departing from the spirit or scope of the invention.

What is claimed is:

1. An endless vulcanized belt track for a track vehicle, said belt track comprising a body of flexible elastomeric material including a ground-contacting surface and a plurality of spaced, rigid, elongated, independent, unitary traction elements extending generally transversely of said belt track, each said element including a base having a relatively flat attaching surface and at least one portion projecting therefrom with said base being secured onto said ground-contacting surface of said body and firmly fixed thereto to form an integral structure solely by means of the adhesive bond created during vulcanization of said belt track and without the use of fastening means in said body, said base surface being substantially coplanar with said ground-contacting surface so that no substantial portion of said element is embedded in the elastomeric material but a substantial portion thereof projects outwardly therefrom to present an exposed surface for ground contact and fillets of elastomeric material formed on said body engaging and adhered to a substantial portion of the sides of each said element to further secure said elements to said body.

2. The belt track as claimed in claim 1, wherein said body includes raised sections along each lateral edge of the belt track and a plurality of ribs extending longitudinally of the belt track, said sections and said ribs integrally formed therewith during vulcanization of said belt track to provide lateral stability for the vehicle during the operation thereof.

3. The belt as claimed in claim 1, wherein each said traction element is a generally U-shaped metallic member.

4. The belt track as claimed in claim 1, wherein each said traction element is a generally inverted T-shaped metallic member.

5. The belt track as claimed in claim 1, wherein said body further includes at least one longitudinally disposed row of openings therethrough to accommodate the vehicle drive means and each said traction element is aligned with the vehicle drive means so that at least a portion of the surface thereof contacts the drive means to provide a wear surface therefor.

6. An endless vulcanized belt track for a sprocket-driven, snow-traveling vehicle, said belt track comprising:
A. a body of reinforced, flexible, elastomeric material containing reinforcement therein for longitudinal stability and including a ground-contacting surface and at least one longitudinally disposed row of sprocket-receiving openings therethrough, and
B. a plurality of spaced, rigid, elongated, independent, unitary traction elements extending transversely of the belt track and disposed between said openings to provide transverse rigidity for the belt track, each said element including a base having a relatively flat attaching surface and at least one portion projecting therefrom with said base being secured onto said ground-contacting surface of said body and firmly fixed thereto to form an integral structure solely by means of the adhesive bond created during vulcanization of said belt track and without the use of fastening means or the reinforcement within said body, said base surface being substantially coplanar with said ground-contacting surface so that no substantial portion of said element is embedded in the elastomeric material but a substantial portion thereof projects outwardly therefrom to present an exposed surface for ground contact with the snow thereby providing traction for the vehicles, and fillets of elastomeric material formed on said body engaging and adhered to a substantial portion of the sides of each said element to further secure said element to said body.

7. The belt track as claimed in claim 6, wherein said body includes raised sections along each lateral edge of the belt track and a plurality of ribs extending longitudinally of the belt, said section and said ribs integrally formed therewith during vulcanization of said belt track to provide lateral stability for the vehicle during the operation thereof.

8. The belt track as claimed in claim 6, wherein said body further includes a plurality of lugs of elastomeric material formed thereon, said lugs disposed between each said traction element longitudinally of the belt track and between each said sprocket-receiving opening transversely of the belt track to provide added traction for the vehicle.

9. The belt as claimed in claim 6, wherein each said traction element is a generally U-shaped metallic member.

10. The belt track as claimed in claim 6, wherein each said traction element is a generally inverted T-shaped metallic member.

11. The belt track as claimed in claim 6, wherein each said traction element is aligned with elements of the sprocket drive or suspension means of the vehicle so that at least a portion of the surface thereof contacts the sprocket or suspension elements to provide a wear surface therefor.

* * * * *